April 21, 1959  E. D. SMYSER  2,882,868
FLUID MOTOR

Filed June 7, 1955 2 Sheets-Sheet 1

ELMER D. SMYSER
INVENTOR

HUEBNER, BEEHLER,
WORREL & HERZIG
ATTORNEYS

April 21, 1959          E. D. SMYSER          2,882,868
FLUID MOTOR
Filed June 7, 1955          2 Sheets-Sheet 2
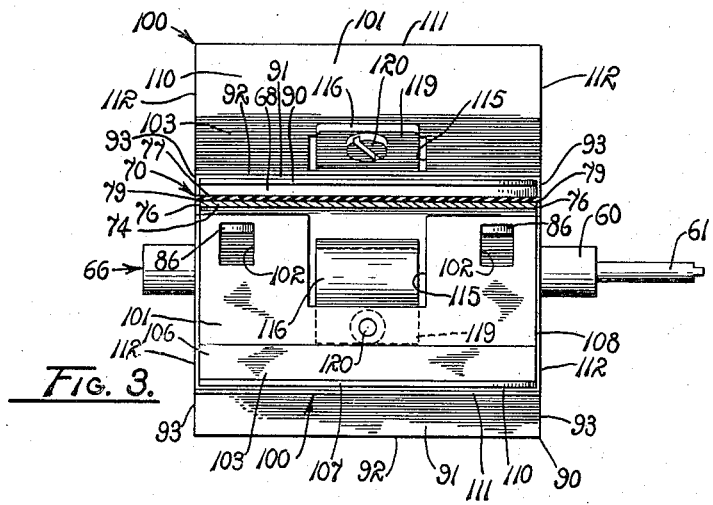
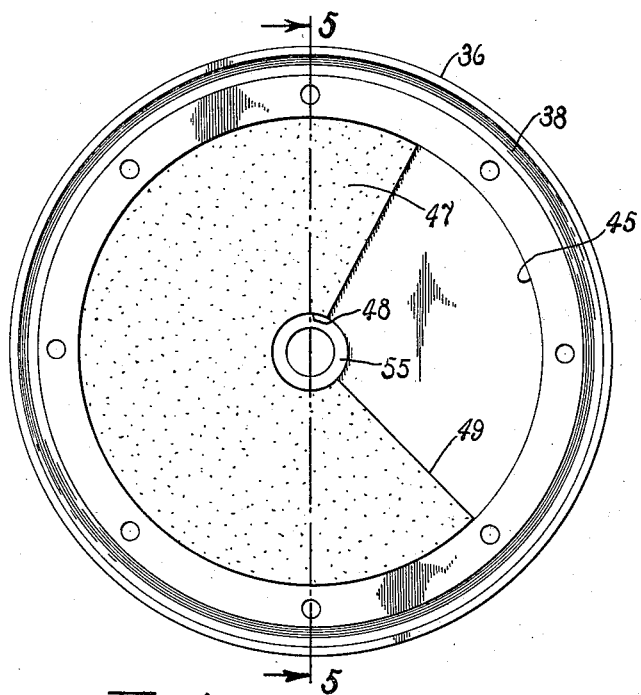
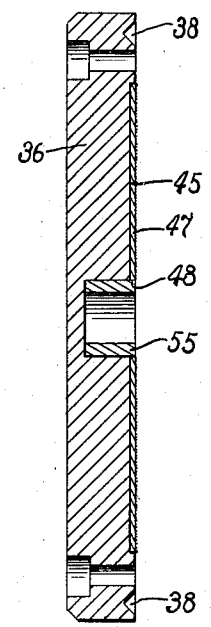
ELMER D. SMYSER
INVENTOR
HUEBNER, BEEHLER,
WORREL & HERZIG
ATTORNEYS
BY Richard M. Worrel United States Patent Office 2,882,868
Patented Apr. 21, 1959

2,882,868
FLUID MOTOR
Elmer D. Smyser, Bakersfield, Calif.
Application June 7, 1955, Serial No. 513,804
18 Claims. (Cl. 121—95)

The present invention relates to rotary fluid motors and more particularly to a fluid flow meter.

The present invention is a continuation-in-part of my prior co-pending application S.N. 275,817, filed March 10, 1952 and entitled Fluid Meters, now Patent No. 2,738,775 granted March 20, 1956. The fluid meter illustrated and described in my designated co-pending application includes a plurality of flexible blades pivotally mounted on a rotor for movement between inner and outer positions in a chamber provided in the body of the meter. Each of these blades is provided with an inner edge in angular relation to the principal surface of the blade which is adapted periodically to engage a stud fixedly mounted on an end wall or cover of the meter body and thereby to urge its respective blade into outer position.

After considerable experimentation and commercial operation of meters constructed in the above described manner, it was found that while the structure was a marked advance over previously known meters, further significant improvements could be made in certain respects. For example, it was deemed desirable to provide improved hinging means for pivotally connecting the blades to the rotor and for urging the blades from inner to outer positions. A prime consideration in the development of these features was the reduction of frictional resistance and drag to rotation of the meter thereby to make such rotation easier so as to minimize wear and to improve the accuracy.

Another problem heretofore unsolved in fluid flow meters occurs principally when the meters are operated under excessively high temperatures. Since such meters are generally provided with sealing means of rubber or the like, as found in the meter of my co-pending application for example, it has been found that expansion of the seal against the walls of the meter increases considerably the frictional resistance to rotation thereof. In some instances, these rubber seals have expanded to such an extent that in the neighborhood of fifty times as much power has been required to maintain rotation. In other cases, this expansion has been so excessive as to stop rotation of the meter.

Accordingly, an object of this invention is to provide an improved fluid motor of the fluid flow metering type.

Another object is to provide a fluid flow meter which runs easier and more smoothly with a minimum of drag and other frictional resistance to rotation than heretofore available.

Another object is to provide an improved means for urging blades of fluid flow meters of the nature described between inner and outer positions during rotation thereof.

Another object is to provide an improved blade construction for use in a fluid flow meter.

Another object is to provide an improved rotor construction adapted to cooperate with an improved form of blade all as employed in a fluid flow meter.

Another object is to provide a blade construction for use in a fluid flow meter adapted to cooperate with an improved means for urging the blades into an outer position during rotation within the meter.

Another object is to provide a meter of the character described having an improved fluid seal and a minimum of leakage even after long periods of operation.

Another object is to minimize or prevent the expansion of fluid seals in fluid flow meters operating in excessive temperatures from impeding and/or stopping operation of the meter.

Another object is to provide a device for wearing down fluid seals as employed in fluid flow meters which does not interfere with the operation of the means for urging the blades into outer position during rotation within the meter.

Other objects are to provide a fluid flow meter which is adapted to pass fluid borne impurities, such as sand and the like, without damage thereto and without appreciable metering errors, which is simple in construction, durable in structure, speedily and economically produced, dependable in operation, and highly effective in accomplishing its intended purposes.

These and other objects will become more fully apparent upon reference to the subsequent description in the specification.

In the drawings:

Fig. 3 is a longitudinal section taken through a complete meter of the type shown in Fig. 1 along a plane represented by line 3—3 of Fig. 1.

Fig. 4 is an inside face view of an end plate and an abrasive disk as employed in the present invention.

Fig. 5 is a transverse section taken on line 5—5 of Fig. 4.

Figure 1:
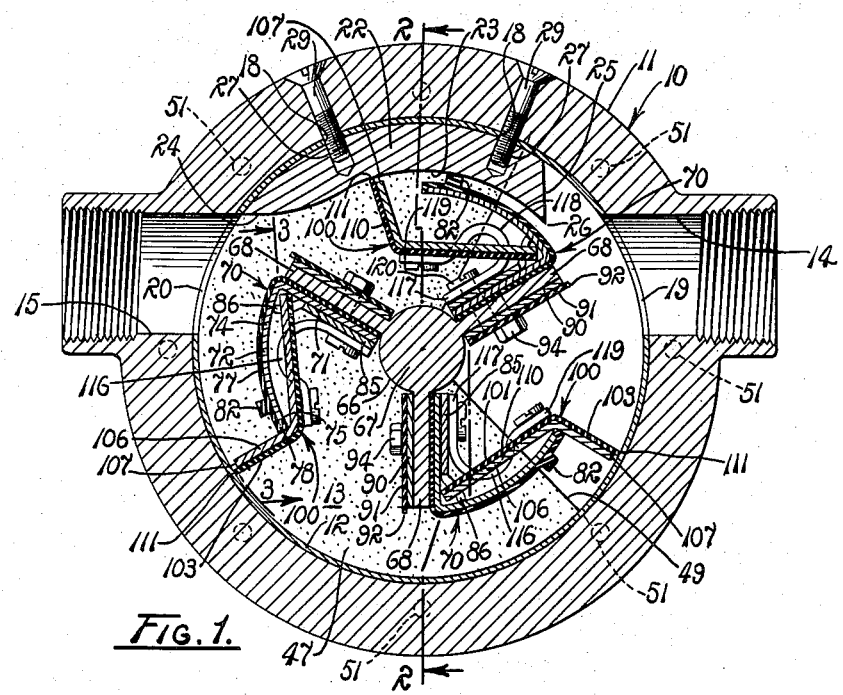
Fig. 1 is a transverse section of a fluid flow meter embodying the principles of the present invention.
Figure 2:
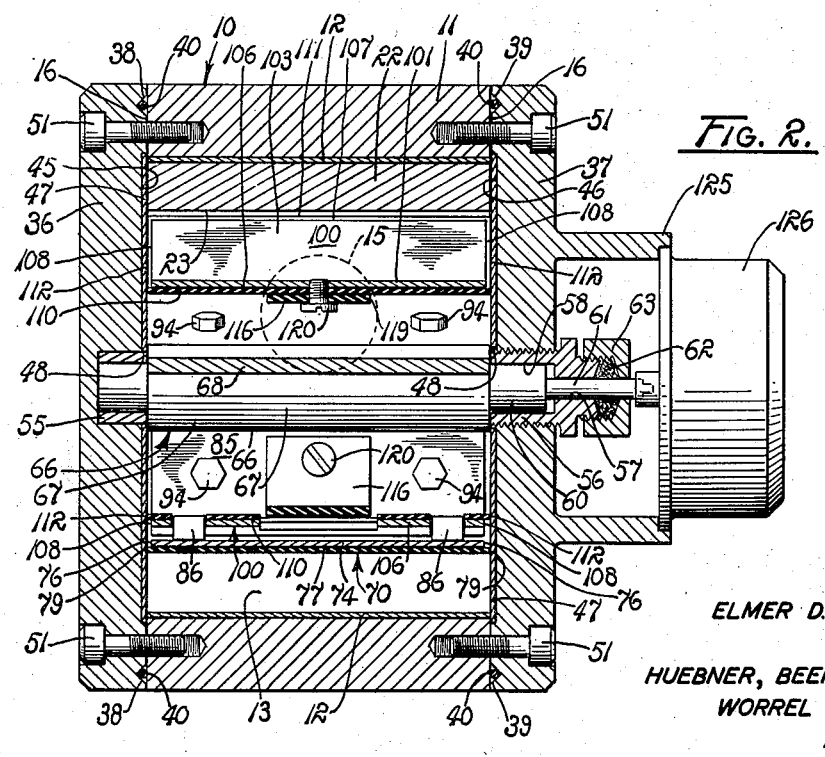
Fig. 2 is a longitudinal section taken through a complete meter of the type shown in Fig. 1 along a plane represented by line 2—2 of Fig. 1.

Referring more particularly to the drawings:

A body member or stator is generally indicated at 10 in Figs. 1 and 2 including a housing 11 mounting a liner 12 therein. The housing provides a substantially cylindrical chamber 13 formed therein and having an inlet port 14 and an outlet port 15. For convenience of connection the ports are provided with internal screw threads. The chamber is terminated in substantially parallel annular end faces 16 lying in planes normal to the longitudinal axis of the chamber.

It will be noted in Fig. 1 that the inlet port 14 and the outlet port 15 are aligned along a common axis eccentrically of the chamber 13 in substantially tagential relation to a circle concentric to the chamber. Although this relation is utilized in commercial forms of the subject invention, it is not regarded as a critical relationship. In fact, it is deemed sufficient if the inlet and outlet ports are spaced circumferentially of the chamber.

The liner 12 is preferably of a rigid metallic material such as stainless steel providing a substantially smooth inner surface. Also, the liner has a pair of bolt holes 18 in adjacent peripherally spaced relation and a pair of inlet and outlet port holes 19 and 20 circumferentially spaced from each other the same distance as inlet and outlet ports 14 and 15 of the housing.

An elongated thickened portion, or bridge, 22 is provided longitudinally of the chamber 13 intermediate the ports 14 and 15 and is mounted on the liner 12. The bridge provides a surface 23 inwardly disposed to the chamber which at all points radially of the chamber is longitudinally parallel to the axis thereof. The inwardly disposed surface of the bridge also provides a gradually inclined front portion 24 and a rear undercut portion 25 extended inwardly of the chamber and terminating in an acuminate rear edge 26. A pair of threaded blind bores 27 are formed in the bridge and are aligned with the bolt holes 18 in the liner.

The liner 12 and the bridge 22 are releasably slidably fitted to the chamber 13 and locked in position by set screws 29 extended through the housing 11, through the bolt holes 18 of the liner and threaded into the bores 27 of the bridge.

A rearward cover 36 is fitted against one of the annular face surfaces 16 and a forward cover 37 is fitted against the opposite face surface 16. The rearward and forward covers are provided with annular grooves 38 and 39, respectively, and O-rings 40 are fitted in the annular grooves for sealing engagement against the end surfaces when the covers are positioned thereagainst.

In addition, and referring to Figs. 2, 4 and 5, in particular, the rearward and forward covers 36 and 37 are provided with substantially circular recessed portions 45 and 46, respectively, inwardly disposed thereon in opposed facing relation when the covers are positioned on the annular end faces 16 of the housing 11. It is to be noted that the diameter of each of the recesses is somewhat greater than the diameter of the chamber 13 whereby the recesses slightly overlap the end faces of the housing when the device is assembled. An abrasive disc, plate or wheel 47 of fractionally circular shape, as shown in Fig. 4, is fitted in each of the recesses and held in position by a suitable bonding agent. Alternately, the discs may be molded into their respective recesses. Each of the abrasive discs provides a concentric central opening 48 and a radial, outwardly divergent, substantially V-shaped cut-out portion 49 positioned in a manner soon to be described.

In practice, each abrasive disc 47 is frequently formed of emery material and of a thickness between 1/64 to 1/8 of an inch. The mere roughening of the inwardly disposed surfaces of the covers 36 and 37 over substantially the same area as encompassed by the discs 47 is to be included within the meaning of the term abrasive as employed with the covers. Other abrasive means will suggest themselves to those skilled in the art, it being understood that the invention is not limited to the described forms.

As illustrated in Fig. 2, however, the abrasive discs 47 peripherally overlap the annular end faces 16 of the housing 11 when the rearward and forward covers 36 and 37 are in position thereon. A plurality of headed bolts 51 are extended through the covers and are screw-threadably mounted in the housing to pull the covers and discs tightly against the end faces of the housing and thus to draw the O-rings 40 into fluid tight engagement therewith.

A pair of axially aligned bearings 55 and 56 are mounted in the covers 36 and 37, respectively, concentrically of the chamber 13. The bearing 55 conveniently consists of a sleeve fitted into the rearward cover 36. The bearing 56 is screw-threadably mounted in a bore extended through the forward cover and provides a bore 57 and a counter-bore 58 concentrically aligned with bearing 55.

As evident in Fig. 2, a rotor shaft 60 is journalled in the bearings 55 and 56 and provides an axial extension 61 journalled in the bore 57 and extended outwardly from the bearing 56. To preclude leaking of fluid from the housing 11 about the axial extension 61, an annular packing 62 is mounted on the extension against the outer end of the bearing 56 and compressed into substantially fluid tight engagement with the extension by means of the packing gland 63.

The rotor shaft 60 constitutes an integral part of a rotor, indicated generally at 66, cast, fabricated or otherwise formed of metallic or other suitable material. The rotor is preferably constructed of a non-corrosive material or coated with such a material to minimize corrosion. A hub 67 is provided concentrically of the shaft and extends longitudinally of the chamber 13 between the abrasive discs 47. A plurality of partitions 68 are radially extended from the hub in substantially equally spaced relation. Although three partitions are shown, it will be evident that the invention is not limited to such number.

A plurality of walls 70 are mounted on the partitions 68 of the rotor 66 and include inner portions 71 extended outwardly of the hub in substantially equally angularly spaced relation along planes radially related to the axis of the hub and arcuate outer portions 72 extended in a common direction around the axis of the hub in substantially concentric circumferentially spaced relation.

The rotor walls 70 also include substantially rigid, preferably metallic, back portions 74 having longitudinal edges 75 in spaced relation to their respectively adjacent partitions 68, rearwardly disposed relative to the direction of rotation of the rotor 66 and end edges 76 in adjacent spaced relation to the abrasive discs 47, the latter as best seen in Figs. 2 and 3. In addition, each rotor wall includes a sheet of elastic, resiliently flexible sealing material 77 secured, as by vulcanization, to the rigid back portion thereof and edgewardly extended from the longitudinal and end edges of said rigid portion, as at 78 and 79, respectively. It is to be noted that the end edges of the sealing sheets of the rotor walls are in sealing engagement, respectively, with the abrasive discs 47. Each of the sealing sheets has an elongated longitudinally extended sealing rib 82 outwardly positioned on the outer portion 72 thereof.

Hinge plates 85 are mounted on the rotor walls 70 against the rigid back portions 74 on the inner portions 71 thereof. Each hinge plate provides a pair of spaced hinge fingers or hooks 86 arcuately extended between the inner and outer portions 71 and 72 of its respective rotor wall and in the inside corner defined by the angular juncture between such inner and outer portions.

Rigid mounting plates 90 are positioned on the partitions 68 on the opposite sides thereof from the rotor wall 70. A sheet of elastic resiliently flexible sealing material, constituting a flap 91, is secured, as by vulcanization, to each mounting plate and provides a longitudinal edge 92 and end edges 93. A pair of headed bolts 94 are extended through each set of sealing flaps 91, mounting plates 90, partitions 68, walls 70 and hinge plates 85 for rigidly securing these members in assembled relation.

A plurality of blades 100 are provided and include inner portions 101 having hinge apertures 102 individually fitted on the hinge fingers 86 of the hinge plates 85. As such, the blades are pivotally mounted on the rotor 66 on axes substantially parallel to the axis of the hub 67 for movement between inner and outer positions in the chamber 13. The axes of the blades are also substantially equally radially spaced from the axis of the hub and are substantially equally peripherally spaced therearound. The inner portions of the blades extend outwardly from their respective axes in a common direction around the axes of the hub along planes tangentially related to a circle concentric to the axis of the hub.

In addition, each of the blades 100 provides an outer portion 103 extended outwardly of the axis of the hub 67 along a plane angularly related to its respective inner portion 101, which outer portion is substantially radial to the hub.

Each of the blades 100 provides a rigid back portion 106, preferably of metallic material, having a longitudinal edge 107 substantially parallel to the axes of the hub 67 and disposed in spaced relation to the circumscribing wall or liner 12 of the housing 11 when the blade is in its outer positon. The rigid portion of each blade has a pair of oppositely disposed end edges 108 in spaced relation to the abrasive discs 47 on the covers 36 and 37 of the body member 10.

The blades 100 further include individual sheets 110 of elastic, resiliently flexible sealing material secured to their respective rigid portions 106 and edgewardly extended along longitudinal and end edges 111 and 112, respectively, of the rigid portions for sealing engagement, respectively with the liner 12 and the abrasive discs 47. Each of the blades 100 has an opening 115 in the inner portion 101 thereof and centrally located between the opposite ends thereof.

A plurality of flat, elongated, resiliently flexible, elastic spring elements 116 of rubber, plastic or the like material, have inner ends 117 individually connected to the inner portions 71 of the rotor walls 70 through the hinge plates 85, substantially U-shaped return bent intermediate portions 118 individually extended transversely of their respective blades 100, and outer ends 119 individually connected to the inner portions 101 of the blades. It is to be noted that the intermediate portions of the spring elements are fitted in the openings 115 of the blades in order to permit flexing movement of such spring elements during pivotal movement of their respective blades. Rivets 120 are individually extended through the inner and outer ends of the spring elements in the hinge plates 85, rotor walls 70 and partitions 68 and the inner portions 101 of the blades, respectively, for holding the spring elements in proper position.

A cylindrical base 125 is outwardly extended from the forward cover plate 37 concentrically of the axial extension 61 and serves to mount an indicator 126 of any suitable form to which visual reference can be made to determine extent of rotation of rotor 66, speed of rotor rotation, and the like. The indicator 126 is connected to the axial extension 61 and is not described in greater detail, inasmuch as many well known forms are suitable for the purpose.

*Operation*

The operation of the meter of this invention is believed to be readily apparent and is briefly summarized at this point.

The meter is conveniently mounted in any fluid conduit, not shown, by screw-threaded engagement of the inlet and outlet ports 14 and 15 on delivery and discharge segments of the conduit. In this regard it is to be noted that the flow meter is mounted in such a manner that the bridge 22 is in an upwardly disposed position, as seen in Fig. 1. The reason for this positioning of the meter will be evident as the operation is more fully described.

Fluid flowing in the inlet port 14 passes into a compartment defined by an outwardly positioned or extended blade 100, an inner portion 71 of a rotor wall 70, an adjacent portion of the hub 67 and the enclosure walls of the chamber 13 defined by the liner 12 and the abrasive discs 47 or cover plates 36 and 37, as the case may be. Movement of such fluid into such a compartment forces the compartment to travel away from the inlet port so as to rotate the rotor 66 in a clockwise direction as viewed in Fig. 1. The rotor is thus given a predetermined direction of rotation around the axis thereof and in a direction traversing the bridge 22 from the outlet toward the inlet port. Each such compartment defined in this manner is made substantially fluid tight by the sealing engagement of the end edges 79 of the flexible sheets 77 of the rotor walls 70 against the abrasive discs 47, by the sealing engagement of the end and longitudinal edges 112 and 111, respectively, of the flexible sheets 110 of the blades 100 against the abrasive discs 47 and the liner 12, respectively, and by the sealing engagement of the rearward longitudinal edges 78 of the flexible sheets 77 of the rotor walls with the blades 100 adjacent the juncture of the inner and outer portions 101 and 103 thereof. It is to be noted that this arrangement effectively seals and isolates each compartment from the other.

As a blade 100, defining a forward wall of any such compartment, reaches the outlet port 15, fluid trapped in such compartment is freed for exhaust through the outlet port. By the time such compartment has reached the outlet port, a following compartment is filled and forced to travel from the inlet port toward the outlet port with its blade 100 in substantially fluid tight frictional engagement with the liner 12 and with the rearward longitudinal edge 78 of the adjacent flexible sheet 77.

As a blade 100 is caused to traverse the bridge 22 by rotation of the rotor 66, it is urged or dragged rearwardly to its retracted or inner position. Such blades, therefore, ride onto the surface 23 of the bridge up the inclined front portion 24 with the longitudinal edges 111 thereof in engagement against the bridge.

Fluid is precluded from passing directly from the inlet port 14 to the outlet port 15 between the outer portion 72 of the rotor walls 70 and the bridge by the sealing flaps 91 and sealing strips 82. It will be obvious from Fig. 1 that as the sealing strip 82 on each rotor wall rides over the surface 23 of the bridge no fluid can travel from the inlet to the outlet port therebetween. Before each strip 82 leaves edge 26 of the bridge, the sealing flap 92 therebehind comes into contact with the bridge and likewise prevents fluid flow therepast. Before each flap leaves the bridge, the following strip comes into contact therewith, and so on to insure constant and effective compartmentation conducive to accurate measurement of fluid flow.

It will be evident that the hydraulic forces exerted on a blade 100 in an extended position is substantially greater than such forces exertable on a retracted blade engaged by the bridge 22. The imbalance in hydraulic forces is productive of the described rotation of the rotor 66 registerable on the indicator 126 for visual reference.

When a blade 100 travels beyond the rear sharp edge 26 of the bridge 22, its spring element 16 flexes outwardly to force or urge the blade into an outwardly extended position with the longitudinal edge 111 of the flexible sheet 110 thereof in sealing engagement against the liner 12. With the bridge in an upper position, the weight of the blade acts as an aid to its movement from inner to outer position. In order to promote still greater free and easy pivotal movement of each blade from its inner to its outer position after disengagement from the bridge, the cut-out portion 49 of the abrasive disc 47 is positioned so as to encompass an area extended or over-lapping the sharp edge of the bridge 22 and extended to a position beyond the inlet port 14. This area is clearly seen in Fig. 1. Thus, as the blade moves from inner to outer position, the end edges 112 of its sealing sheet 110 are in spaced relation to the rearward and forward covers 36 and 37 and do not act to impede movement of the blade, as might be the case if the abrasive discs were extended into this area.

The employment of rubber, or the like, spring elements 116 for urging the blades 100 into outer position against the liner 12, or circumscribing wall, of the chamber 13 is of considerable significance in the present invention. These spring elements are found to make the fluid meter run in the easiest possible manner. The force which they exert against their respective blades, although relatively light, is sufficient to urge the blades into their outer positions where they are maintained by the on-rush of fluid therebehind. As explained above, however, it has been found highly desirable to cut away the abrasive discs 47 in the area where the blades move from their inner to their outer positions. Inasmuch as the spring elements are designed to exert a minimum outward force on the blades, any strong resistance to such outward movement is objectionable.

It will be readily apparent that the reason for providing spring elements 116 with quite moderate outward force is to enable the blades 100 to be easily urged from outer to inner position when engaged by the bridge 22. Thus, since the rubber spring elements offer little resistance, the blades are readily forced into their inner positions by the bridge when passing thereover. In this manner, the rotor runs more easily and with a more uniform speed inasmuch as there is little resistance to movement.

The provision of rubber, or the like, spring elements 116, has however, necessitated the further provision of openings 115 in the blades 100 to accommodate flexing or bending movement of the spring elements incident to pivotal movement of the blades. It was found after considerable experimentation that the spring elements would break off in continuous use when such openings in the blades were not provided. The openings receive the intermediate portions 118 of the spring elements and no resistance, crimping or cramping of the spring elements at their bending area or joint occurs.

It is also worthy of note that the abrasive discs 47 have been employed to enable operation of the meter at high temperatures, such as in hot oil wells and the like. It has been found that the rubber, or like material, employed on the blades 100, rotor walls 68 and the like tended to expand considerably when the meter was working under predetermined high temperatures. The expansion of the rubber is sometimes so excessive that the meter stops turning or inordinate amounts of rotative force are necessary in order to maintain rotation.

When the edges, such as 79, 93 and 112, of the flexible sheets rub against the abrasive discs 47, as provided in the present invention, these edges are continually filed or worn down and maintained at the correct size so as to insure proper sealing engagement against the walls 36 and 37 of the body member 10 and yet to preclude harmful resistance to rotation of the meter through excessive frictional engagement of the rubber edges against such walls. It is to be understood, however, that the present invention is not limited to the use of these abrasive discs inasmuch as they may be omitted in many operational environments.

From the foregoing, it will be evident that a fluid meter has been provided which is highly effective for accomplishing its intended functions. The improved meter is designed to run in an easier manner and for this purpose is equipped with flat, resiliently flexible elastic spring elements, of such material as rubber or the like, for urging the blades into outer positions. A special shape of blade has been provided to enable the most effective operation with the type of spring element employed. In addition, the fluid meter of this invention provides adequate sealing means for insuring fluid tight integrity of the plurality of compartments defined by the rotor and the blades. Abrasive means have been utilized to prevent the fluid seals from impeding the easy rotation afforded by the spring elements and portions of the abrasives have been removed to permit the spring elements to urge the blades from inner to outer positions. These features, among others, provide a fluid meter which is sturdy in construction, durable in operation and which, in practice, has been found to be a substantial improvement over those of the prior art.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a fluid motor, the combination of a body member providing a substantially cylindrical chamber circumscribed by a wall having spaced inlet and outlet ports in communication with the chamber; a rotor mounted for rotation in the chamber about a predetermined axis substantially concentric to the chamber; a plurality of blades pivotally mounted on the rotor on axes adjacent to the wall of the chamber and substantially parallel to the predetermined axis for movement inwardly and outwardly of the rotor, said axes also being substantially equally radially spaced from said predetermined axis and peripherally spaced therearound, the blades having inner portions extended from their respective axes in a common direction around the predetermined axis relatively inwardly of the rotor and away from the wall along planes tangentially related to a circle concentric to said axis and having outer portions extended outwardly of said axis along planes angularly related to their respective inner portions and substantially radial to the axis; a plurality of elongated substantially rectangular elements of resiliently flexible non-corrosive material each having a width less than the dimension of the blades measured longitudinally of the chamber and lying substantially flat when relaxed, being individually mounted adjacent to the blades having inner ends connected to the rotor and outer ends individually connected to inner portions of their respective blades and being thereby folded into substantially U-shapes for yieldably urging the outer portions of their blades into engagement with the body member.

2. In a fluid motor, the combination of a body member providing a chamber circumscribed by a substantially cylindrical wall and having spaced inlet and outlet ports in communication with the chamber; a rotor mounted for rotation substantially concentrically in the chamber about a predetermined axis; a plurality of blades pivotally mounted on the rotor on axes adjacent to the wall of the chamber substantially parallel to the predetermined axis for movement inwardly and outwardly of the rotor, said axes also being substantially equally radially spaced from said predetermined axis and peripherally spaced therearound, the blades having inner portions extended relatively inwardly of the rotor from their respective axes in a common direction around the predetermined axis along planes tangentially related to a circle concentric to said axis and having outer portions extended outwardly substantially radially from said axis along planes angularly related to their respective inner portions, each of the blades having an opening in the inner portion thereof; and a plurality of elastic resiliently flexible elements having inner ends connected to the rotor individually adjacent to the blades, having intermediate folded portions extended through the openings of their respective blades, and having outer ends individually connected to the blades for yieldably urging the outer portions of their respective blades into engagement with the body member.

3. In a fluid motor, the combination of a body member having a chamber circumscribed by a substantially cylindrical wall providing spaced inlet and outlet ports in communication with the chamber; a rotor mounted for rotation in the chamber about a predetermined axis substantially concentric to the wall of the chamber and including a hub concentric with said axis and a plurality of walls extended outwardly of the hub in substantially equally angularly spaced relation along planes radially related to said axis and thence extended in a common direction around said axis along planes angularly related to their respective radially related planes, each of the walls terminating in a longitudinal edge peripherally spaced from the adjacent wall; and a plurality of blades individually mounted on the walls on axes adjacent to the wall of the chamber substantially parallel to the predetermined axis for movement between outer positions in engagement with the body member and inner positions, said blades being extended from their respective axes in said common direction along planes tangentially related to a circle concentric to said axis relatively inwardly of the rotor and thence outwardly substantially radially of said axis along planes angularly related to their respective tangentially related planes, and the blades being engageable with the longitudinal edges of their respectively adjacent walls in the outer positions thereof to define a plurality of individual compartments within the body member.

4. In a fluid motor, the combination of a body member having a pair of substantially parallel end walls and a substantially cylindrical circumscribing wall defining a chamber therein, and spaced inlet and outlet ports in communication with the chamber; a rotor mounted in the chamber for rotation about a predetermined axis substantially concentric to the circumscribing wall; a plurality of blades pivotally mounted on the rotor on axes adjacent to the circumscribing wall substantially parallel to said predetermined axis for movement between inner and outer positions in the chamber, said axes also being substantially equally radially spaced from said predetermined axis and peripherally spaced therearound, the blades having inner portions extended from their respective axes in a common direction around the predetermined axis along planes tangentially related to a circle concentric to said axis and relatively inwardly of the rotor and having outer portions extended outwardly of said axis along planes angularly related to their respective inner portions substantially radially of the circumscribing wall of the chamber, each blade having a substantially rigid portion providing oppositely disposed end edges in spaced relation to the end walls of the body member and a longitudinal edge substantially parallel to said predetermined axis and disposed in spaced relation to the circumscribing wall of the body member in the outer position of such blade, and each blade further having a sheet of resiliently flexible and compressible sealing material secured to the rigid portion thereof and edgewardly extended from its end and longitudinal edges in slidable fluid sealing engagement, respectively, with the end and circumscribing walls of the body member in the outer position of its respective blade.

5. In a fluid motor, the combination of a body member having a pair of substantially parallel end walls and a substantially cylindrical circumscribing wall defining a chamber therein, and spaced inlet and outlet ports in communication with the chamber; a rotor mounted in the chamber for rotation about a predetermined axis including a hub concentric with said axis and a plurality of walls having inner portions extended outwardly of the hub in substantially equally angularly spaced relation along planes radially related to said axis and outer portions extended in a common direction around said axis in concentric circumferentially spaced relation, the rotor walls having rigid portions providing longitudinal edges substantially parallel to said axis and end edges in adjacent spaced relation to the end walls of the body member; a plurality of blades pivotally mounted on the rotor on axes substantially parallel to said predetermined axis for movement between inner and outer positions in the chamber, said axes also being substantially equally radially spaced from said predetermined axis and peripherally spaced therearound, the blades having inner portions extended from their respective axes in a common direction around the predetermined axis along planes tangentially related to a circle concentric to said axis and having outer portions extended outwardly of said axis along planes angularly related to their respective inner portions, the blades having substantially rigid portions providing oppositely disposed end edges in spaced relation to the end walls of the body member and longitudinal edges substantially parallel to said predetermined axis and disposed in spaced relation to the circumscribing wall of the body member in the outer positions of the blades, the blades further having sheets of resiliently flexible sealing material individually secured to the rigid portions and edgewardly extended from the end and longitudinal edges of the rigid portions for engagement, respectively, with the end and circumscribing walls of the body member in the outer positions of the blades, and each rotor wall having a sheet of resiliently flexible sealing material secured to the rigid portion thereof and edgewardly extended from the end and longitudinal edges thereof, the blades being engageable with the longitudinally extended edges of the sealing sheets of their respectively adjacent walls in the outer positions thereof to define a plurality of individual substantially fluid tight compartments within the body member.

6. In a fluid motor, the combination of a body member having a chamber, an enclosure wall for the chamber, and spaced inlet and outlet ports in communication with the chamber; abrasive means on the wall of the chamber; a rotor mounted in the chamber for rotation about a predetermined axis; a plurality of blades of a material subject to expansion on rise in temperature thereof mounted on the rotor and outwardly extended therefrom, each of the blades having resiliently flexible edges in light sealing engagement with the abrasive means, said abrasive means being adapted to wear away the resiliently flexible edges of the blades when a rise of temperature causes expansion thereof thereby to maintain said light sealing engagement.

7. In a fluid motor, the combination of a body member having a chamber, enclosure walls for the chamber, and spaced inlet and outlet ports in communication with the chamber; abrasive means on the walls of the chamber; a rotor mounted in the chamber for rotation about a predetermined axis; a plurality of blades pivotally mounted on the rotor on axes substantially parallel to said predetermined axis, each of the blades including a rigid backing and a sheet of resiliently flexible material secured to the backing providing extended edges engageable with the abrasive means, said abrasive means being adapted to wear away the edges of the resiliently flexible sheets when a rise of temperature causes expansion thereof.

8. In a fluid motor, the combination of a body member having a chamber, end walls for the chamber, and spaced inlet and outlet ports in communication with the chamber; an abrasive disk mounted on each wall at opposite ends of the chamber; a rotor mounted in the chamber for rotation about a predetermined axis; a plurality of blades pivotally mounted on the rotor on axes substantially parallel to said predetermined axis, each of the blades having resiliently flexible edges in light sealing engagement with the abrasive disks being adapted to wear away the resiliently flexible edges of the blades when a rise of temperature causes expansion thereof.

9. In a fluid motor, the combination of a body member including a substantially cylindrical chamber therein having opposite ends, a substantially cylindrical wall in circumscribing relation to the chamber, a pair of end walls at opposite ends of the chamber and an inlet port and an outlet port in communication with the chamber and circumferentially spaced therearound; a rotor mounted in the body member concentrically of the chamber for rotation around a predetermined axis and in a predetermined direction from the outlet to the inlet port; a plurality of blades pivotally mounted on the rotor on axes substantially parallel to the predetermined axis for movement inwardly and outwardly in the chamber relative to said axis, each of the blades having resiliently flexible marginal edges subject to expansion upon rise in temperature; means individually yieldably urging the blades outwardly of the chamber, the body member including bridge means mounted on the cylindrical wall thereof intermediate the inlet and outlet ports engageable with the blades during passage thereof from the outlet to the inlet port for urging the blades inwardly of the chamber during such passage; and abrasive means on the end walls of the body member in rubbing sealing contact with adjacent marginal edges of the blades, said abrasive means being interrupted in an area extended from the bridge means to beyond the inlet port to permit free pivotal movement of the blades from inward to outward positions under urgence of the yieldable means upon disengagement from the bridge means.

10. In a fluid motor, the combination of a body member including a substantially cylindrical chamber therein having opposite ends, a substantially cylindrical wall in circumscribing relation to the chamber, a pair of end walls at opposite ends of the chamber, and an inlet port and an outlet port in communication with the chamber and circumferentially spaced therearound; a rotor mounted in the body member concentrically of the chamber for rotation around a predetermined axis and in a predetermined direction from the outlet to the inlet port; a plurality of blades providing rigid portions having end edges adjacent to the end walls of the body member and longitudinal edges substantially parallel to rotor axis pivotally mounted on the rotor on axes substantially parallel to the predetermined axis for movement inwardly and outwardly in the chamber relative to said axis, each of the blades further having a sheet of resiliently flexible material adhered to its rigid portion and providing end edges and a longitudinal edge respectively extended from the end edges and longitudinal edge of such rigid portion and being subject to expansion upon rise in temperature; means individually yieldably urging the blades outwardly of the chamber, the body member including a bulged portion mounted on the cylindrical wall thereof intermediate the inlet and outlet ports in sealing engagement with the longitudinal edges of the flexible sheets of the blades during passage thereof from the outlet to the inlet port for urging the blades inwardly; and a pair of disks individually mounted on the end walls of the body member in rubbing contact with the end edges of the resiliently flexible sheets of the blades, each disk having a cut-out portion adjacent to the inlet port and the bulged portion to permit free pivotal movement of the blades from inner to outer positions under urgence of the yieldable means upon disengagement from the bridge means.

11. In a fluid motor, the combination of a body member including a substantially cylindrical chamber therein having opposite ends, a substantially cylindrical wall in circumscribing relation to the chamber, a pair of end walls at opposite ends of the chamber and an inlet port and an outlet port in communication with the chamber and circumferentially spaced therearound; a rotor mounted in the body member concentrically of the chamber for rotation around a predetermined axis and in a predetermined direction from the outlet to the inlet port; a plurality of blades pivotally mounted on the rotor on axes substantially parallel to the predetermined axis for movement inwardly and outwardly in the chamber relative to said axis, each of the blades providing rigid back portions having end edges adjacent to the end walls of the body member and a longitudinal edge substantially parallel to the rotor axis, each of the blades further having a sheet of resiliently flexible material adhered to its back portion and providing end edges and a longitudinal edge respectively extended from the end and longitudinal edges of its back portion and being subject to expansion upon rise in temperature; a plurality of flat resiliently flexible elastic spring elements having inner ends connected to the rotor individually adjacent to the blades, having intermediate portions extended transversely of their respective blades and having outer ends individually connected to the blades for yieldably urging the blades outwardly for contact of the longitudinal edges of the resiliently flexible sheets of the blades with the cylindrical wall of the body member, each of the blades having an opening in registration with the intermediate portion of the spring element associated therewith for accommodating flexing of such spring elements during pivotal movement of its respective blade, the body member including a bulged portion mounted on the cylindrical wall thereof intermediate the inlet and outlet ports engageable with the longitudinal edges of the flexible sheets of the blades during passage thereof from the outlet to the inlet port for urging the blades inwardly of the chamber during such passage; and a pair of disks individually mounted on the end walls of the body member in rubbing contact with the end edges of the resiliently flexible sheets of the blades, each disk having a cut-out portion adjacent the inlet port and bulged member to permit free pivotal movement of the blades from inner to outer positions under urgence of the respective spring elements upon disengagement from the bridge means.

12. In a fluid motor, having a body providing a substantially cylindrical chamber, a rotor mounted in the chamber for rotation about a predetermined axis, a plurality of blades pivotally mounted on the rotor on axes substantially parallel to the axis of rotation of the rotor for movement inwardly and outwardly from the axis, the blades being subject to expansion upon rise in temperature, means individually and resiliently urging the blades outwardly from the axis of rotation of the rotor, and means mounted within the chamber engageable with the blades to urge the blades traveled therepast by rotation of the rotor inwardly of the axis of rotation and disengageable from the blades at a predetermined position in the chamber to release the blades for movement outwardly of said axis; abrasive means on the end walls of the body member in rubbing sealing contact with the blades, said abrasive means being interrupted in the area in which the blades are released for outward movement.

13. In a fluid motor, the combination of a body member having a substantially cylindrical chamber circumscribed by a wall and providing opposite end walls; a rotor mounted in the body member for rotation about an axis substantially concentric to the chamber; a plurality of blades pivotally mounted on the rotor on axes substantially parallel to the axis of rotation of the rotor for movement inwardly and outwardly relative to the axis, each of the blades having marginal edges subject to expansion upon rise in temperature; means individually and resiliently urging the blades outwardly from the axis of rotation of the rotor to bring the blades into engagement with the circumscribing wall; means mounted within the chamber engageable with the blades upon rotor rotation to urge the blades inwardly relative to the axis of rotation and adapted to disengage the blades for movement of the blades outwardly of said axis at a predetermined area within the chamber; and abrasive means on the end walls of the body member in rubbing sealing contact with the adjacent marginal edges of the blades, said abrasive means being interrupted in the area in which the blades are released for outward movement to avoid impeding such movement by engagement of the blades with the abrasive means.

14. In a fluid motor, a body member providing a chamber and spaced fluid inlet and outlet ports communicating with the chamber, a rotor mounted for rotation in a predetermined forward direction in the chamber about an axis of rotation and having a plurality of walls providing inner radially outwardly extended portions and outer portions angularly extended from their respective inner portions in a common direction circumferentially of the chamber opposite to the direction of rotation of the rotor, said outer rotor wall portions terminating in an edge substantially parallel to said axis and spaced from adjacent walls peripherally of the chamber whereby fluid is admitted into the areas defined by each rotor wall and its adjacent wall, and a plurality of blades providing inner portions having openings therein and being individually pivotally mounted on the walls of the rotor and outer portions secured to the inner portions for movement therewith between positions outwardly extended in engagement with the body member and said edges of their respective forwardly adjacent outer rotor wall portions and inner retracted positions, said openings allowing fluid to pass therethrough during movement of the blades between their inner and outer positions, each of said blades having a rear surface disposed rearwardly thereof with respect to the direction of rotation of the rotor, each of said rear surfaces being respectively spaced circumferentially of the rotor from its rearwardly adjacent wall in said outwardly extended positions thereby allowing passage of fluid between each blade and its respective rearwardly adjacent wall.

15. In a fluid motor, the combination of a body member providing a chamber circumscribed by a substantially cylindrical wall and having spaced inlet and outlet ports in communication with the chamber; a rotor mounted for rotation substantially concentrically in the chamber about a predetermined axis; a plurality of blades pivotally mounted on the rotor on axes adjacent to the wall of the chamber substantially parallel to the predetermined axis for movement inwardly and outwardly of the rotor, said axes also being substantially equally radially spaced from said predetermined axis and peripherally spaced therearound, the blades having inner portions extended relatively inwardly of the rotor from their respective axes in a common direction around the predetermined axis along planes tangentially related to a circle concentric to said axis and having outer portions extended outwardly substantially radially from said axis along planes angularly related to their respective inner portions, each of the blades having an opening in the inner portion thereof; and a plurality of elongated elements of resiliently flexible and compressible non-corrosive material having inner ends connected to the rotor individually adjacent to the blades, having intermediate folded portions extended through the openings of their respective blades, and having outer ends individually connected to the blades for yieldably urging the outer portions of their respective blades into outer positions in engagement with the body member, each of said blades having a rear surface disposed rearwardly thereof with respect to the direction of rotation of the rotor, each of said rear surfaces being respectively spaced circumferentially of the rotor from its rearwardly adjacent wall in said outwardly extended positions thereby allowing passage of fluid between each blade and its respective rearwardly adjacent wall.

16. In a fluid motor, the combination of a body member having a chamber circumscribed by a substantially cylindrical wall providing spaced inlet and outlet ports in communication with the chamber; a rotor mounted for rotation in the chamber about a predetermined axis substantially concentric to the wall of the chamber and including a plurality of walls extended outwardly of the axis in angularly spaced relation along planes substantially radially related to said axis and thence extended in a common direction in angular relation to said radially related planes, each of the walls terminating in a longitudinal edge peripherally spaced from an adjacent wall; and a plurality of blades of predetermined thickness individually mounted on the walls adjacent to the juncture of the inner and outer portions on axes substantially parallel to the predetermined axis for movement between outer positions in engagement with the body member and inner positions, said blades having inner portions extended from their respective axes in said common direction along planes substantially tangentially related to a circle concentric to said axis of rotation of the rotor and having outer portions extended outwardly of said rotor axis along planes angularly related to their respective inner portions, the inner and outer portions of each of the blades meeting in a corner having an outwardly disposed edge, the spacing between each of said longitudinal rotor wall edges and its adjacent wall being greater than the thickness of a blade and the blades being engageable with the longitudinal edges of their respectively adjacent walls and said outwardly disposed edges of the blades being forwardly spaced circumferentially of the rotor from their respective rearwardly adjacent walls in their outer positions thereof to define a plurality of individual compartments within the body member, the blades being disengageable from said longitudinal edges in said inner positions.

17. In a fluid motor, the combination of a body member having a chamber circumscribed by a substantially cylindrical wall providing spaced inlet and outlet ports in communication with the chamber; a rotor mounted for rotation in the chamber about a predetermined axis substantially concentric to the wall of the chamber and including a plurality of walls extended outwardly of the axis in angularly spaced relation along planes substantially radially related to said axis and thence extended in a common direction in angular relation to said radially related planes, each of the walls terminating in a longitudinal edge peripherally spaced from an adjacent wall; and a plurality of blades individually mounted on the walls adjacent to the juncture of the inner and outer portions on axes substantially parallel to the predetermined axis for movement between outer positions in engagement with the body member and inner positions, said blades having inner portions extended from their respective axes in said common direction along planes substantially tangentially related to a circle concentric to said axis of rotation of the rotor and having outer portions extended outwardly of said rotor axis along planes angularly related to their respective inner portions, said inner portions having openings therein through which fluid is allowed to pass, the blades having rear surfaces disposed rearwardly thereof with respect to the direction of rotation of the rotor, and the blades being engageable with the longitudinal edges of their respectively adjacent walls and said rear surfaces of the blades being spaced circumferentially of the rotor from their respective rearwardly adjacent walls in the outer positions thereof to define a plurality of individual compartments within the body member opening into the chamber, the blades being disengageable from said longitudinal edges of the walls in said inner positions.

18. In a fluid motor, the combination of a body member providing a substantially cylindrical chamber circumscribed by a wall having spaced inlet and outlet ports in communication with the chamber; a rotor mounted for rotation in the chamber about a predetermined axis substantially concentric to the chamber; a plurality of blades pivotally mounted on the rotor on axes adjacent to the wall of the chamber and substantially parallel to the predetermined axis for movement inwardly and outwardly of the rotor, said axes also being substantially equally radially spaced from said predetermined axis and peripherally spaced therearound, the blades having inner portions extended from their respective axes in a common direction around the predetermined axis relatively inwardly of the rotor and away from the wall along planes tangentially related to a circle concentric to said axis and having outer portions extended outwardly of said axis along planes angularly related to their respective inner portions and substantially radial to the axis; a plurality of elongated elements of resiliently flexible material each having a width substantially less than the dimension of the blades measured longitudinally of the chamber, lying substantially flat when relaxed, and being individually mounted adjacent to the blades having inner ends connected to the rotor and outer ends individually connected to inner portions of their respective blades and being thereby folded into substantially U-shapes for yieldably urging the outer portions of their blades into engagement with the body member.

References Cited in the file of this patent

UNITED STATES PATENTS

| | | |
|---|---|---|
| 39,832 | Platt | Sept. 8, 1863 |
| 330,001 | Conver et al. | Nov. 10, 1885 |
| 719,222 | Huyck | Jan. 27, 1903 |
| 719,634 | Austin | Feb. 3, 1903 |
| 1,654,005 | Luxmore | Dec. 27, 1927 |
| 2,636,478 | Smyser | Apr. 28, 1953 |

FOREIGN PATENTS

| | | |
|---|---|---|
| 107,811 | Germany | Jan. 27, 1900 |